(12) United States Patent
Marwell

(10) Patent No.: US 8,751,084 B2
(45) Date of Patent: Jun. 10, 2014

(54) VEHICLE COMPONENT RECOGNITION AND ADJUSTMENT FOR ENERGY EFFICIENCY

(75) Inventor: Stuart E. Marwell, Katonah, NY (US)

(73) Assignee: Curtis Instruments, Inc., Mt Kisco, NY (US)

(*) Notice: Subject to any disclaimer, the term of this patent is extended or adjusted under 35 U.S.C. 154(b) by 0 days.

(21) Appl. No.: 13/466,176

(22) Filed: May 8, 2012

(65) Prior Publication Data

US 2013/0304287 A1 Nov. 14, 2013

(51) Int. Cl.
*B60L 9/00* (2006.01)
*B66C 1/00* (2006.01)
*G05D 3/12* (2006.01)

(52) U.S. Cl.
USPC .............................. 701/22; 414/719; 700/288

(58) Field of Classification Search
USPC .............................. 701/22; 700/288; 414/719
See application file for complete search history.

(56) References Cited

U.S. PATENT DOCUMENTS

| | | | |
|---|---|---|---|
| 4,686,437 A | 8/1987 | Langley et al. | 318/254 |
| 5,065,320 A | 11/1991 | Hayashi et al. | 364/424.01 |
| 5,162,997 A * | 11/1992 | Takahashi | 701/1 |
| 5,176,213 A | 1/1993 | Kawai et al. | 180/243 |
| 5,367,455 A | 11/1994 | Kitagawa et al. | 364/424.01 |
| 5,471,384 A | 11/1995 | Nakashima et al. | 364/424.01 |
| 5,532,672 A | 7/1996 | Plazarin | 340/440 |
| 5,532,929 A * | 7/1996 | Hattori et al. | 701/110 |
| 5,539,399 A | 7/1996 | Takahira et al. | 340/995 |
| 5,734,099 A | 3/1998 | Saigo et al. | 73/114 |
| 5,808,428 A * | 9/1998 | Ito et al. | 318/139 |
| 5,878,831 A | 3/1999 | Saito et al. | 180/206 |
| 5,892,346 A | 4/1999 | Moroto et al. | 318/587 |
| 5,991,677 A | 11/1999 | Kinugawa et al. | 701/50 |
| 6,470,252 B2 * | 10/2002 | Tashiro et al. | 701/51 |
| 6,480,106 B1 | 11/2002 | Crombez et al. | 340/461 |
| 6,553,297 B2 * | 4/2003 | Tashiro et al. | 701/48 |
| 6,717,281 B1 * | 4/2004 | Brandon et al. | 290/40 C |
| 6,750,622 B2 | 6/2004 | Simizu et al. | 318/139 |
| 6,831,429 B2 | 12/2004 | Fu | 318/19 |
| 6,991,053 B2 * | 1/2006 | Kuang et al. | 180/65.235 |
| 7,808,204 B2 * | 10/2010 | Matsumoto et al. | 320/101 |
| 2008/0066991 A1 | 3/2008 | Kataoka et al. | 180/443 |
| 2009/0112383 A1 | 4/2009 | Lenart et al. | 701/22 |
| 2009/0171523 A1 * | 7/2009 | Luo et al. | 701/22 |
| 2009/0218987 A1 | 9/2009 | Tominaga | 320/134 |
| 2009/0299558 A1 * | 12/2009 | Hidaka | 701/22 |
| 2009/0319111 A1 | 12/2009 | Tu | 701/22 |
| 2010/0052588 A1 | 3/2010 | Okamura et al. | 318/434 |
| 2010/0138091 A1 | 6/2010 | Tang et al. | 701/22 |
| 2010/0161162 A1 * | 6/2010 | Kitanaka et al. | 701/22 |
| 2010/0274428 A1 * | 10/2010 | Hwang | 701/22 |

FOREIGN PATENT DOCUMENTS

WO WO-2008/032884 A1 3/2008

* cited by examiner

*Primary Examiner* — Thomas Black
*Assistant Examiner* — Tyler Paige
(74) *Attorney, Agent, or Firm* — Harrington & Smith

(57) ABSTRACT

An apparatus including a plurality of electric vehicle movement components, where a first one of the components is configurable to operate in one of a plurality of power operational modes; and a connection connecting the plurality of electric vehicle components to each other. The first component is configured to select one of the operational modes based, at least partially, upon information through the connection regarding an identification of a second different one of the components and/or an operational capability of the second component.

24 Claims, 10 Drawing Sheets

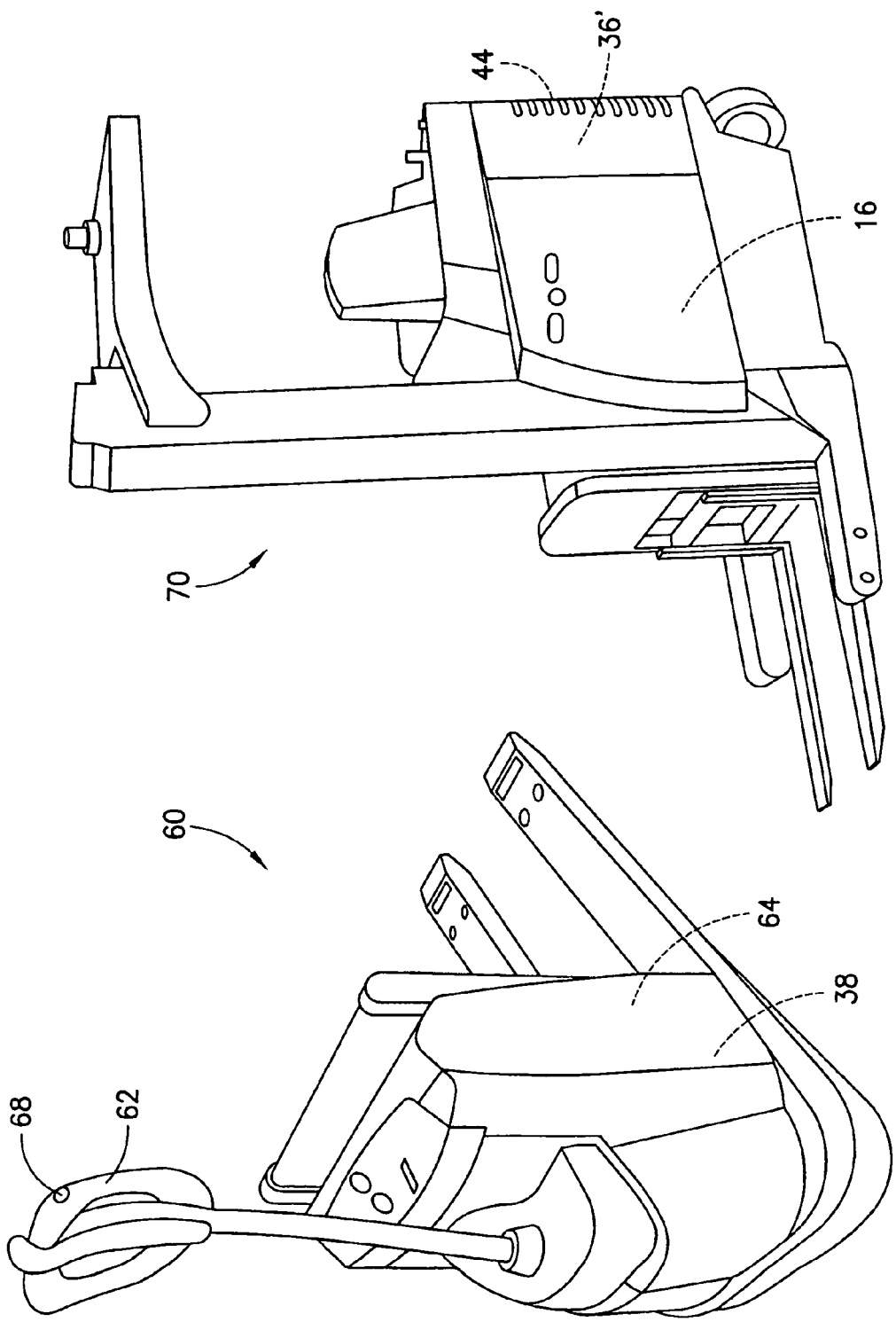

VEHICLE COMPONENT RECOGNITION AND ADJUSTMENT FOR ENERGY EFFICIENCY

BACKGROUND

1. Technical Field

The exemplary and non-limiting embodiments relate generally to a vehicle and, more particularly, to improving energy efficiency.

2. Brief Description of Prior Developments

U.S. Pat. No. 5,065,320 discloses a control/display panel used in a forklift. The panel can be used by the operator to select different modes, such as maximum travel speed, maximum travel acceleration, lift speed. The display system can measure electric consumption. U.S. Pat. No. 6,480,106 discloses a rate of consumption gauge with variable rate of consumption limits. U.S. Patent Publication No. 2009/0112383 discloses an operator selectable switch for vehicle performance routines of speed and amount of regenerative breaking. U.S. Pat. No. 4,686,437 discloses controlling a motor in a plurality of modes for efficiency maximization of power conversion. U.S. Pat. Nos. 5,257,190 and 5,532,672 relate to information generated from a management system including battery charge, and vehicle travel feedback based upon battery charge.

SUMMARY

The following summary is merely intended to be exemplary. The summary is not intended to limit the scope of the claims.

In accordance with one aspect, an apparatus is provided including a plurality of electric vehicle movement components, where a first one of the components is configurable to operate in one of a plurality of power operational modes; and a connection connecting the plurality of electric vehicle components to each other. The first component is configured to select one of the operational modes based, at least partially, upon information through the connection regarding an identification of a second different one of the components and/or an operational capability of the second component.

In accordance with another aspect, an apparatus is provided comprising a plurality of electric vehicle movement components, where a first one of the components is configurable to operate in one of a plurality of operating power ranges; and a system allowing the first component to select one of the operating power ranges based, at least partially, upon information from a second different one of the electric vehicle movement components regarding power capabilities of the second component. The system enables the first component to select the operating power range to improve energy use efficiency by the first component and/or the second component.

In accordance with another aspect, an apparatus is provided comprising a first electric vehicle movement component, where the first component is configured to operate in one of a plurality of power operational modes; and a second electric vehicle movement component connected to the first component. The first movement component is configured to select one of the power operational modes based upon a signal from the second component indicating identification and/or operational capability of the second component without any other signal from another device or another electric vehicle movement component.

In accordance with another aspect, a method comprises connecting a first electric vehicle movement component to a second different vehicle movement component; sending a signal from the second component to the first component, where the signal: identifies the second component to the first component, and/or indicates a power operational capability of the second component to the first component, and based, at least partially, upon the signal from the second component, the first component selecting a power operational mode for the first component to operate to increase energy use efficiency by the first and second components.

BRIEF DESCRIPTION OF THE DRAWINGS

The foregoing aspects and other features are explained in the following description, taken in connection with the accompanying drawings, wherein:

FIGS. 5-11 are perspective views of various different example embodiments using at least some of the components shown in FIG. 4;

DETAILED DESCRIPTION OF EMBODIMENTS

Figure 1:
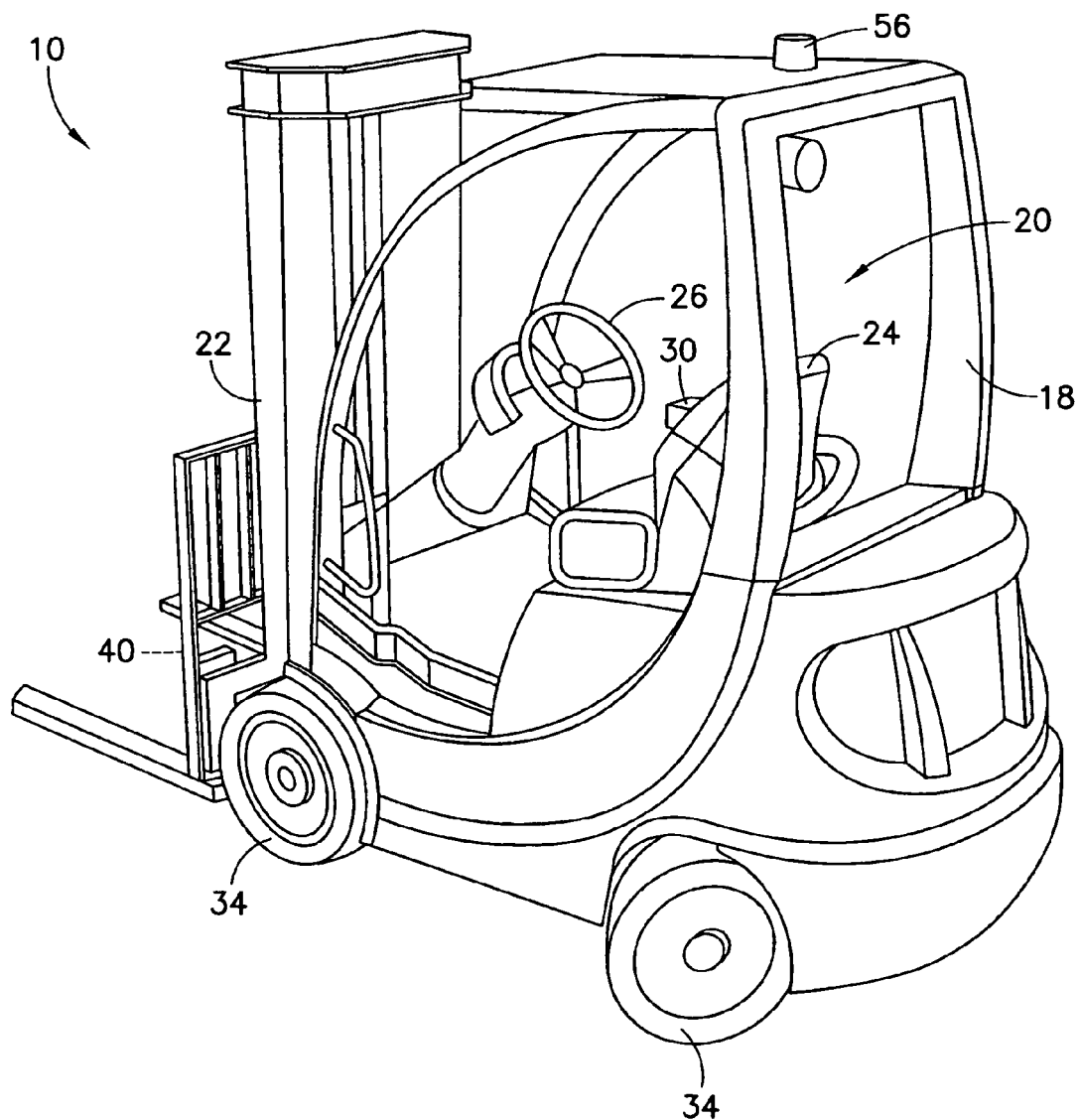
FIG. 1 is a perspective view of an example embodiment.

Referring to FIG. 1, there is shown a perspective view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

Figure 2:
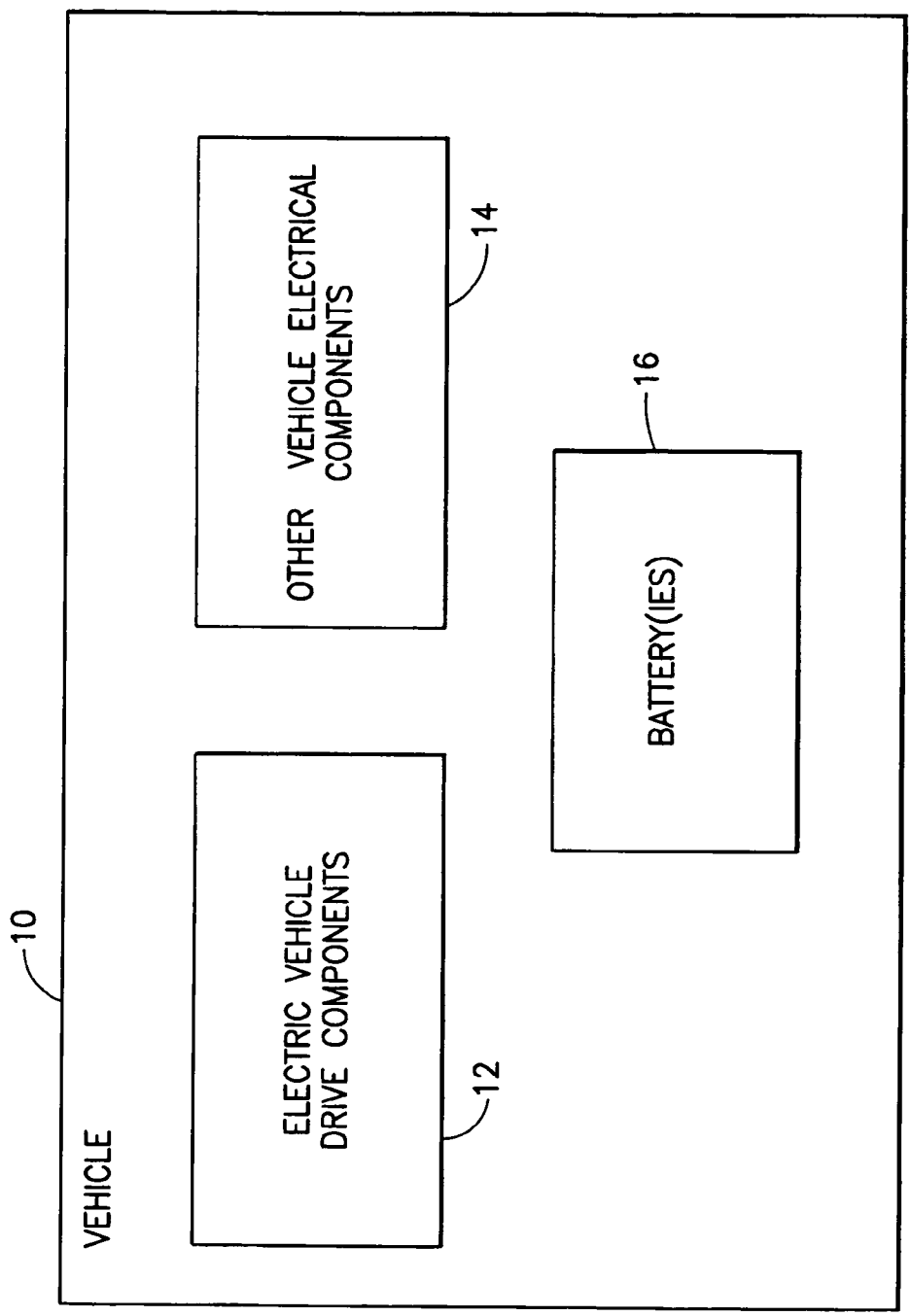
FIG. 2 is a diagram illustrating some components of the apparatus shown in FIG. 1.
Figure 3:
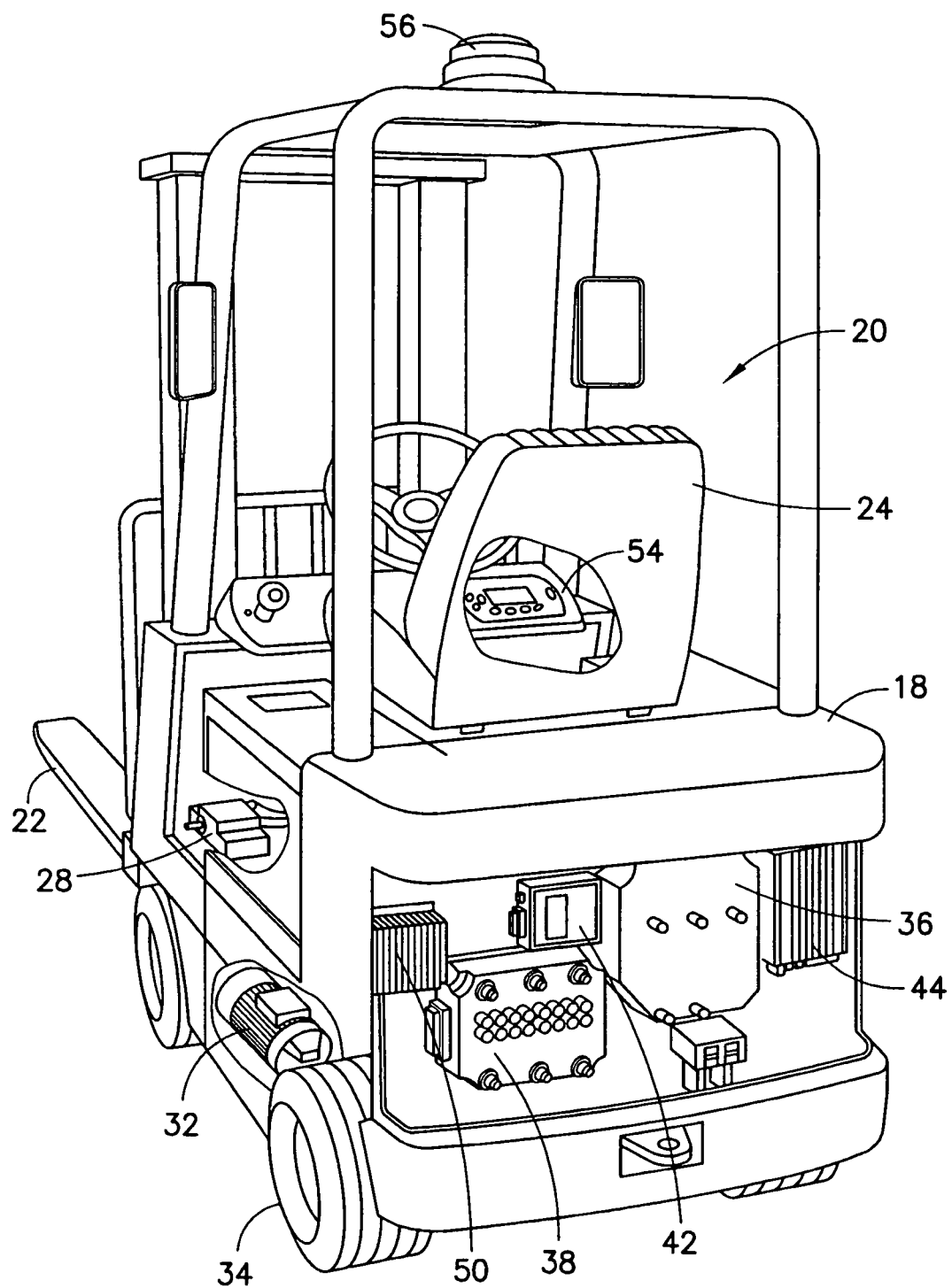
FIG. 3 is a perspective view with a cut away section of the apparatus shown in FIG. 1.

The apparatus 10, in this example embodiment, is a battery operated vehicle; namely, a forklift. Referring also to FIG. 2, the forklift 10 includes electric vehicle movement components or modules 12, other vehicle electrical components or modules 14, and at least one battery 16. Referring particularly to FIG. 1 and FIG. 3, the forklift 10 generally comprises a chassis 18 forming a driver compartment 20, and a lift apparatus 22 at the front of the chassis 18. In this embodiment the driver compartment 20 comprises an operator seat 24 and some of the electric vehicle movement components including a steering wheel 26, a foot pedal 28 and a forklift control input device 30.

Figure 7:
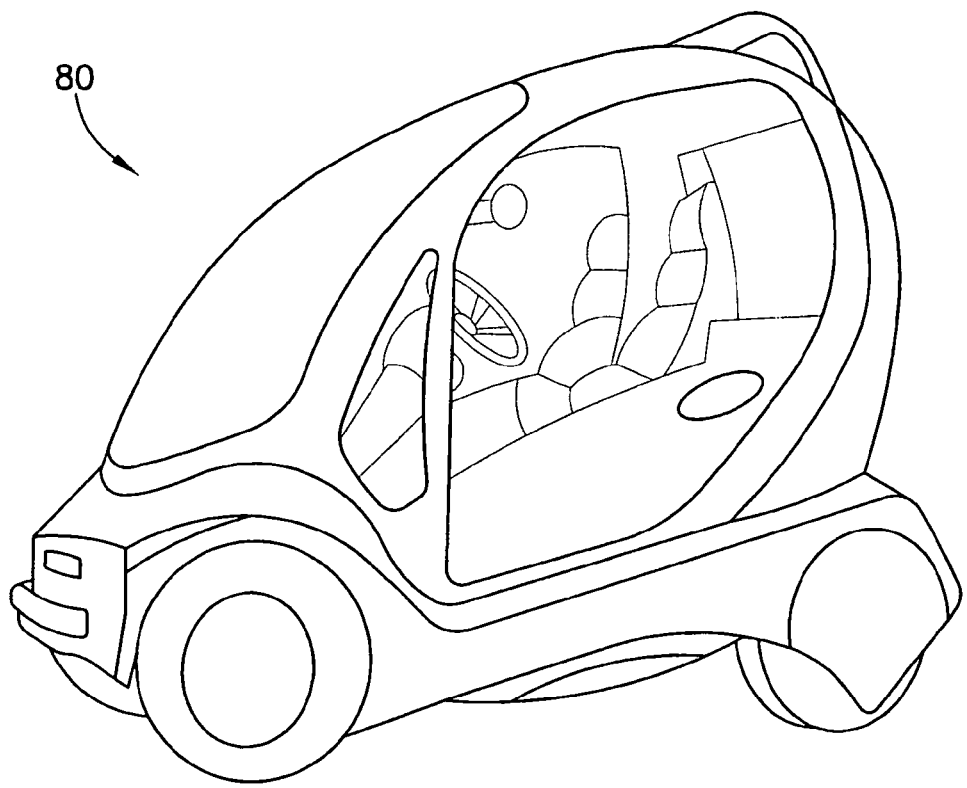
Figure 8:
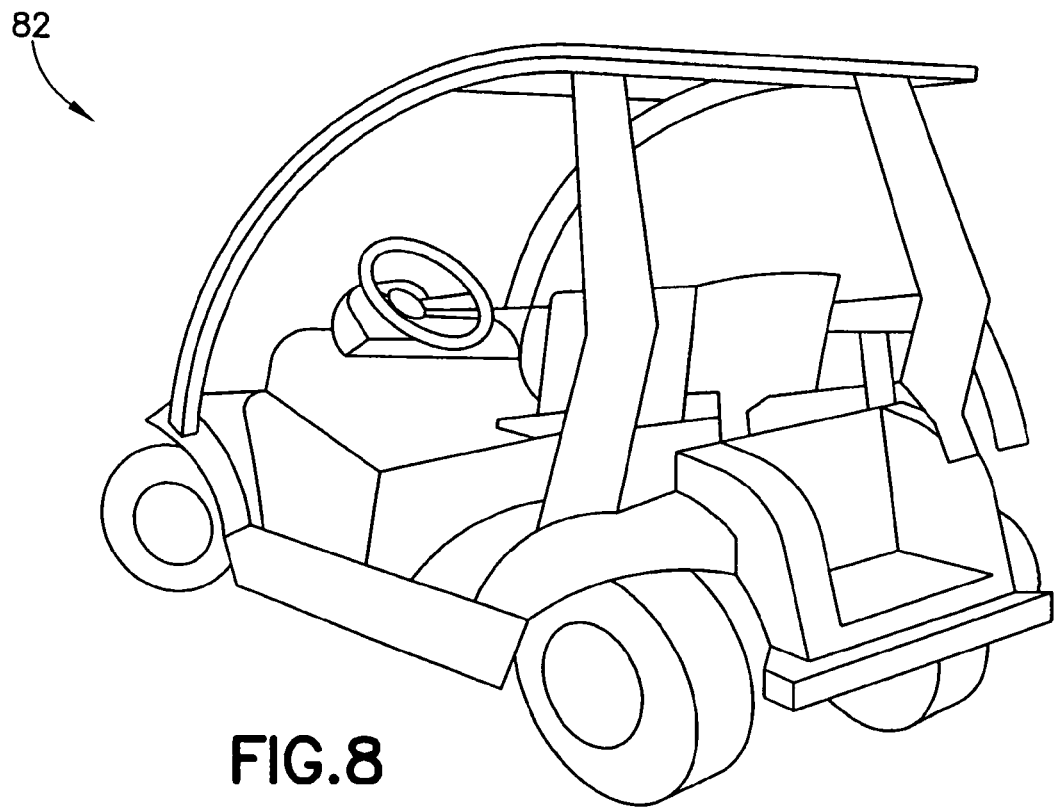
Figure 10:
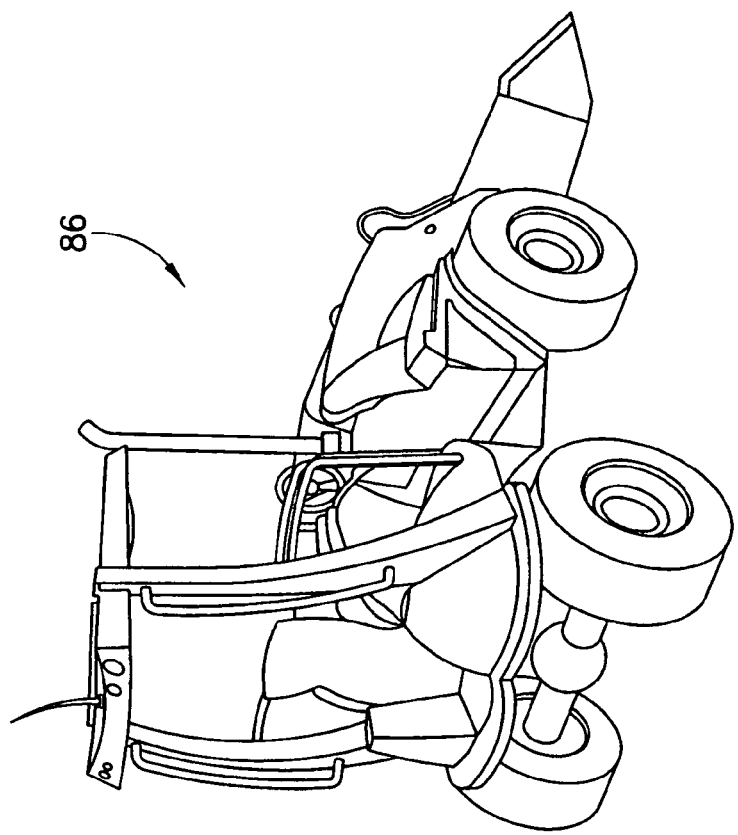
Figure 9:
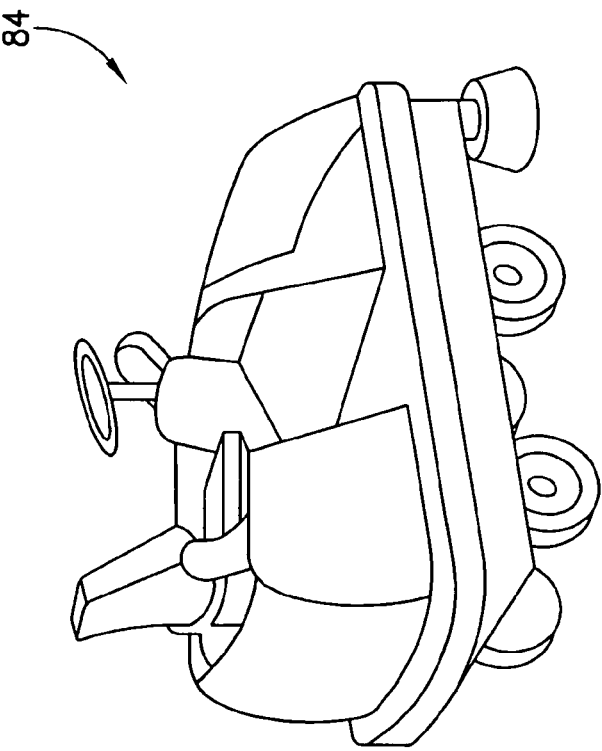
Figure 11:
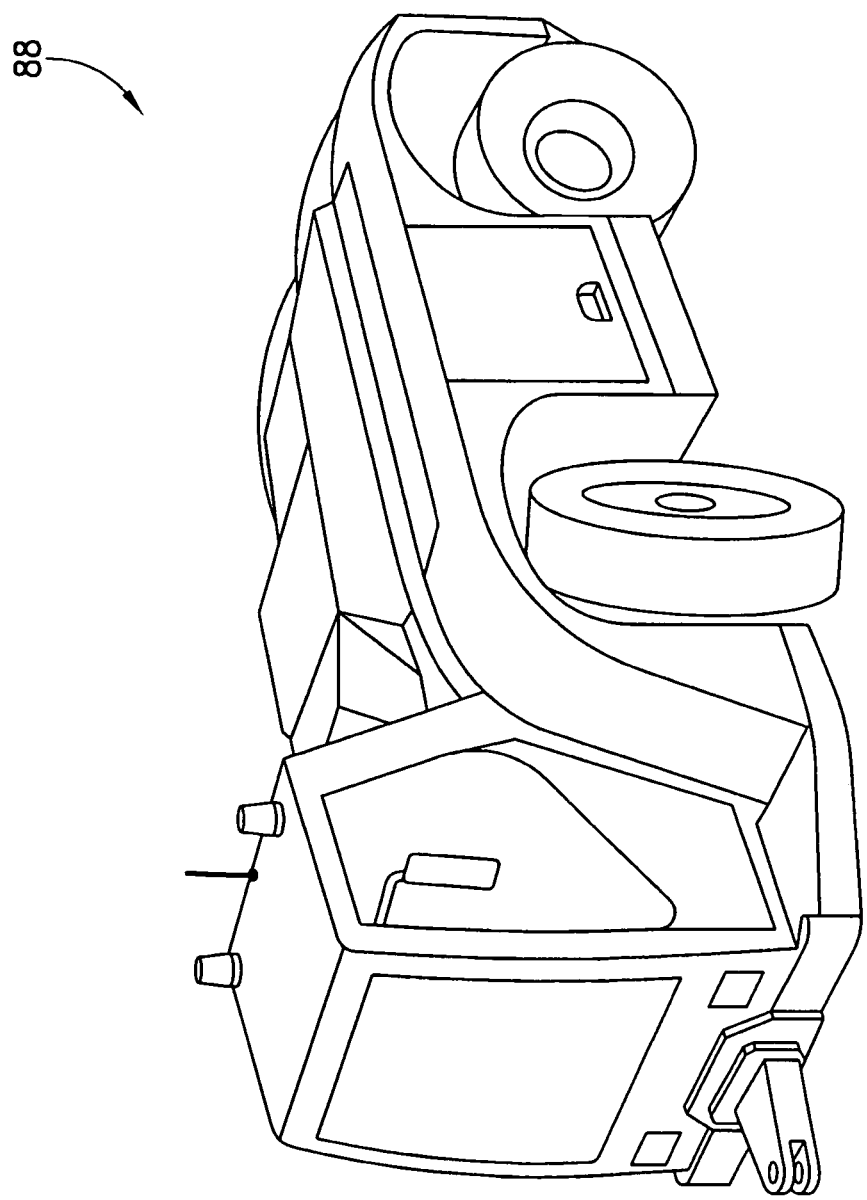

Features described herein are not limited to use in forklifts or material handling equipment. Other applications include automobiles 80 as illustrated in FIG. 7, golf cars 82 as illustrated in FIG. 8, cleaning vehicles 84 as illustrated in FIG. 9, front end loaders 86 as illustrated in FIG. 10 and airport vehicles 88 as illustrated in FIG. 11. These are only some examples. Industries include aerial lift, airport, construction, golf, industrial, material handling, medical mobility such as wheelchairs, light-on-road, sweepers/scrubbers and telecommunications for example.

Features as described herein can help to extend battery life, by the use of software and hardware, before the battery needs to be recharged. The motor controller of the battery powered vehicle can provide at least one mode to reduce use of the battery by the driver and thereby optimize power management. For example, the motor controller could reduce the maximum speed of the vehicle to 5 MPH, or maximum speed of forklift arm movement (battery operated electric hydraulic pump), to extend the battery life.

The user could be provided with operator selectable modes to select different levels of performance. The controller could also be automatic. For example, at a start of a shift, recognizing that the battery is fully charged, the controller might allow the vehicle to operate at 90 percent of capacity. When the vehicle has been used for a while, and the battery charge is reduced to 75 percent, the controller might allow the vehicle to operate at only 75 percent capacity. When the vehicle has been used for a while longer, and the battery charge is reduced to 40 percent, the controller might allow the vehicle to operate at only 50 percent capacity. This can help to extend the charge of the battery so the vehicle can be used for an entire shift before the battery effectively dies and needs to be recharged.

A learning algorithm could learn how often the battery needs to be recharged and set the levels of performance in order to insure that the vehicle does not run out of battery charge during a work day (and can be recharged at night).

The vehicle can use the motor controller, battery monitoring and instrument display to regulate and control the electric vehicle.

Feedback can be provided to the driver to also optimize energy, power management, efficiency; thereby extending battery life. The 'green' or 'eco' mode could be operator selectable to provide different levels of performance—including, but not limited to, open loop (no feedback), visual cues to enhance performance, and or actual HW/SW intervention to enhance power/energy management. The goal is to extend battery life over an operating shift or many operating shifts.

In one example embodiment a battery powered vehicle may be provided having an electric drive system and an electric powered hydraulic lift system, where the power/energy management system provides control and feedback to the user regarding both systems. In at least one mode the user interface can provide power/energy management system control and/or feedback regarding the lift system separately from the drive system. In at least one mode the user interface can provide power/energy management system control and/or feedback regarding the lift system in conjunction with the drive system.

Figure 4:
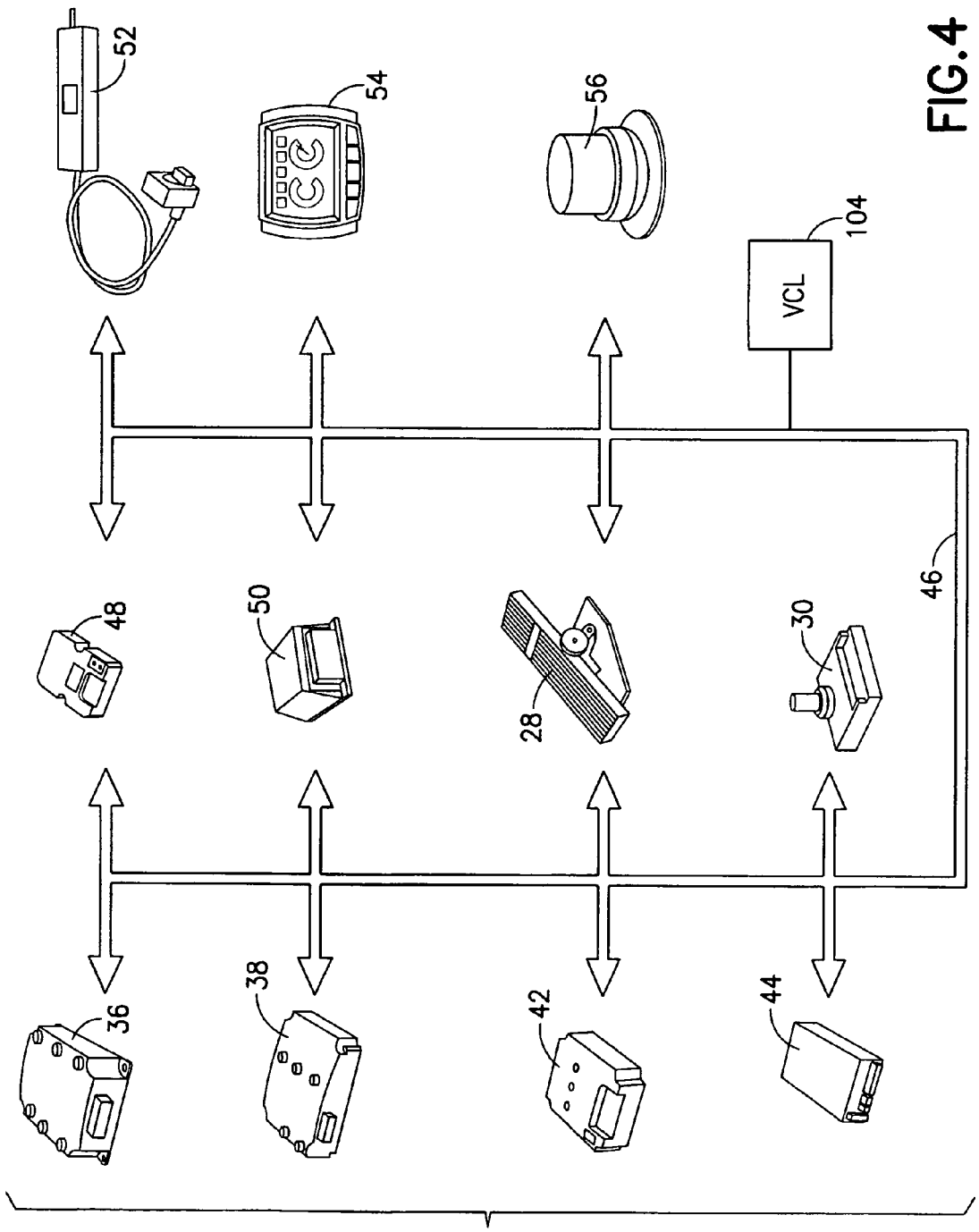
FIG. 4 is a diagram illustrating some of the components of the apparatus shown in FIGS. 1 and 3.

In one type of example embodiment the modules use a vehicle control language (VCL), illustrated as 104 in FIG. 4, to configure and control the components 12, 14. The language can be configured to control a broad scope of electric vehicle (EV) functions. The components 12, 14 are vehicle agnostic. They are designed to plug and play in a plurality of EVs within specified power ranges. Modules control specific vehicle functions or they interact with each other as part of a coordinated Network to control a plurality of EV functions. The vehicle control language (VCL) allows custom application logic to be applied to the Modules/Network to provide a flexible level of control. Modules, Network and vehicle control language (VCL) synergistically interact to control EV performance, with a special emphasis on energy management/conservation.

OE Manufacturers of electric vehicles such as fork lift trucks, off-road people/cargo carriers, power wheelchairs, industrial tug vehicles, as well as automotive EVs often develop inflexible system solutions that are limited by vehicle specific software and electro-mechanical constraints. System sub-assemblies (Modules) are often designed to fit and function with only one specific vehicle type. Vehicle performance/functionality cannot be easily modified or enhanced. Systems cannot be easily scaled up or down, customized or tuned for a specific application or function. The vehicle may be tuned to a specific duty cycle.

With features described herein, a plug-and-play system solution allows OEMs the flexibility to factory or field-modify a plurality of EV types to accommodate different application requirements. A flexible plug-and-play system solution can be configured to manage and conserve energy to extend the EV working range. At least one of the controllers (which control energy use from the battery) can recognize another of the controllers and change an energy use setting to use energy from the battery more efficiently (even though input is the same). Thus, the change in the setting can have the controller effectively "interpret" input differently by acting differently based upon the recognized other controller. With multiple controllers connected to a same network, an address ID (such as an IP address or CAN Node address) can be used.

FIG. 4 shows a number of modules that communicate with each other using industry standard communication busses such as, but not limited to CANbus, LIN, and USB. A Module contains hardware circuits and software algorithms that control targeted vehicle control functions such as traction, pump (lift/lower), steering, etc. It is possible to combine functions such as pump and traction control into a single Module. Some Modules are designed to support a range of power levels to accommodate vehicles of varying power requirements.

Other Modules control functions related to I/O (Input/Output) expansion control, instrumentation display, DC/DC voltage conversion, battery monitoring (State of Charge and State of Health), throttle control, and lighting. Vehicle control language (VCL) is used as a built-in programmable language for implementing unique and complex vehicle control functions. It is also used to configure and control data transfer on the Network. Vehicle control language (VCL) allows data to be exchanged and processed between Modules on the Network. System intelligence can be scaled to meet the needs of the vehicle application.

A traction controller exemplifies a Module that can be attached to the Network. Traction controllers contain power and digital electronics with sophisticated, embedded software algorithms that control the current delivered to the traction motors. Traction controllers are responsible for many aspects related to EV drive performance and efficiency, such as Field Weakening. Traction controllers also are responsible for delivering regenerative power to the battery during braking, which extends the battery charge time. A traction controller can be tuned to a specific motor/vehicle to optimize driving performance and efficiency using a programming tool and procedure. A battery monitor exemplifies another type of Module attached to the Network. A battery monitor consists of power and digital electronics with embedded software algorithms that measure battery state of charge and state of health. The traction controller and battery monitor modules exchange data via the Network to monitor and control the vehicle's energy consumption, as the battery charge depletes. A 'limp mode' can be enabled to conserve energy. Further, if an 'ECO' or 'Green' mode is enabled, a more aggressive energy conservation regime could be applied to optimize energy/power management/efficiency with the goal of extending battery life over the EV operating shift or many operating shifts. Vehicle control language (VCL) provides a higher level of energy management as all modules attached to the Network could be monitored for efficient energy usage and appropriate measures taken. Non-essential energy consuming Modules attached to the Network could be placed into low energy consumption modes. If an instrumentation display module is attached to the Network, visual feedback can provide cues or prompts to the operator to drive in a more energy efficient manner.

Referring back to FIGS. 1-3, the electric vehicle movement components 12 include electric wheel drive motors 32 (only one of which is shown) connected to the wheels 34, dual traction controllers 36, a lift or pump controller 38 connected to a hydraulic pump 40 of the lift apparatus 22, a steering controller 42, a vehicle movement management system 44, and user input devices such as the foot pedal 28 and the forklift control input device 30 for example. The electric vehicle movement components 12 may include additional or alternative components, or less than all the components mentioned above.

Referring also to FIG. 4, the electric vehicle movement components 12 are connected to each other by a connection 46. In this example the connection 46 is a communication bus network such as CANbus, LIN or USE for example. However, any suitable communications connection could be provided including more than just one. The vehicle management system 44 comprises a memory, a processor and software. The vehicle management system 44 functions as a controller for the apparatus 10. However, as explained below, in another example embodiment the vehicle management system 44 need not be provided.

As noted above, the apparatus 10 includes other vehicle electrical components 14. In this example the other vehicle electrical components 14 include a system expansion module 48, a DC/DC converter 50, a battery monitor 52, instrumentation 54 and a visual warning indicator such as beacon 56. These other vehicle electrical components 14 are also connected to the communications connection 46. Thus, all of the electric vehicle movement components 12 and all of the other vehicle electrical components 14 can, at least potentially, communicate with each other. In an alternate embodiment one or more of the electric vehicle movement components 12 and/or the other vehicle electrical components 14 might not be connect to the same connection 46.

In this example embodiment, all of the electric vehicle movement components 12 are each configurable to operate in one of a plurality of power operational modes. However, in an alternate example one or more of the electric vehicle movement components 12 might not be configurable. Thus, it might be adapted to operate in only one power operational mode. The electric vehicle movement components 12 are each configured to select one of their respective operational modes based, at least partially, upon information through the connection 46 regarding an identification of at least one second different one of the components 12 and/or an operational capability of the second component 12.

For example, there are different types of tractions controllers 36 which could be selected when manufacturing the forklift 10. These different types of traction controllers 36 have different power use capabilities and ranges. When the traction controller 36 is connected to the connection 46, a signal is sent from the traction controller 36 to the vehicle management system 44 informing the vehicle management system 44 of the identification of the traction controller 36 and/or an operational capability of the traction controller 36. The vehicle management system 44 can use this information to select its operational mode to operate better with the traction controller 36. This can be used to improve efficiency of the apparatus 10 and to extend the working life of the battery 16 before recharge and/or provide better power use by the components 36, 44 as they work together.

Curtis Instruments, Inc. of Mount Kisco, New York offers a variety of traction controller topology types (e.g. Series, Separately Excited, Permanent Magnet, AC Induction), supporting a wide range of power ranges (24V-96V, 70A-650A), that address numerous market needs( such as Golf, Material Handling, Aerial Platform, Sweeper/Scrubber, On Road Electric Vehicle, Ground Support, Utility and Medical). This illustrates different power use capabilities of different traction controllers which the vehicle management system 44 could automatically adjust for when it recognizes the connected traction controller. Models include programmable parameters which also could be automatically indicated to the vehicle management system 44, and the vehicle management system adjust its power use configuration (for interaction with the connected traction controller) accordingly.

In addition to possibly using the vehicle management system 44 with different traction controllers 36, the traction controller 36 is configurable such as based upon what type of wheel drive motor(s) 32 it is being used with and/or based upon user selected settings. The traction controller(s) 36 can share information regarding the wheel drive motor(s) 32 with the vehicle management system 44, or share settings of the tractions controller(s) 36 regarding the specific wheel drive motor(s) 32 the traction controller(s) 36 is/are connected to. For example, the traction controller 36 could be configured or be "tuned" based upon user selected settings such as a speed mode limiting maximum speed, or acceleration, or brake rate, or a torque mode to adjust parameters to set up a throttle mapping and current limits. The signal sent to the vehicle management system 44 from the traction controller 36 can include this information and the vehicle management system 44 is configured to select its operational mode based upon this information. With this selection of mode, the control signals between the vehicle management system 44 and the traction controller 36 are tailored or more closely matched to the capabilities of the traction controller 36 to thereby use energy (battery power) more efficiently.

The example given above regarding the traction controller 36 and the vehicle management system 44 is merely exemplary. The same type of configurability or tailoring could be used among any of the electric vehicle movement components 12. The configuring could be automatic without any user input. However, in another type of example embodiment, after the automatic selection of mode(s), the apparatus 10 could be configured to allow the user or manufacturer to further fine tune the energy use capabilities of one or more of the components 12, such as at the instrumentation 54 for example.

As another example, the apparatus 10 could be manufactured with any one of a number of different foot pedals 28; each having at least a slightly different output signal or range of output signals. The vehicle management system 44 could be configured to select a mode of operation based upon a signal from the foot pedal indicating the identification of the type of foot pedal or indicating energy use capabilities (such as power output range) of the foot pedal 28. Thus, the two components 44 and 28 can have power use capabilities matched, or limited closer to each other, to prevent waste of power from the battery 16.

Features regarding the configurability matching could also be used between one or more of the electric vehicle movement components 12 and one or more of the other vehicle electrical components 14. For example, the vehicle could be manufactured using any one of a number of different instrumentation 54; each instrumentation 54 having a different power use capability. The vehicle management system 44 could recognize the installed instrumentation 54 on the connection 46 and select an operational mode of the vehicle management system 44 based upon the type of instrumentation 54 installed or based upon the power use capabilities/limitations of the installed instrumentation 54. Thus, the two components 44 and 54 can have power use capabilities matched, or limited closer to each other, to prevent waste of power from the battery 16.

The battery monitor 52, in this example, is configured to detect the type of battery(ies) 16 installed in the apparatus 10. The battery monitor 52 is configured to send a signal to the vehicle management system 44 identifying the battery or its capability. The vehicle management system 44 is configured to select an operational mode based upon that signal to prevent waste of power from the battery 16.

Figure 13:
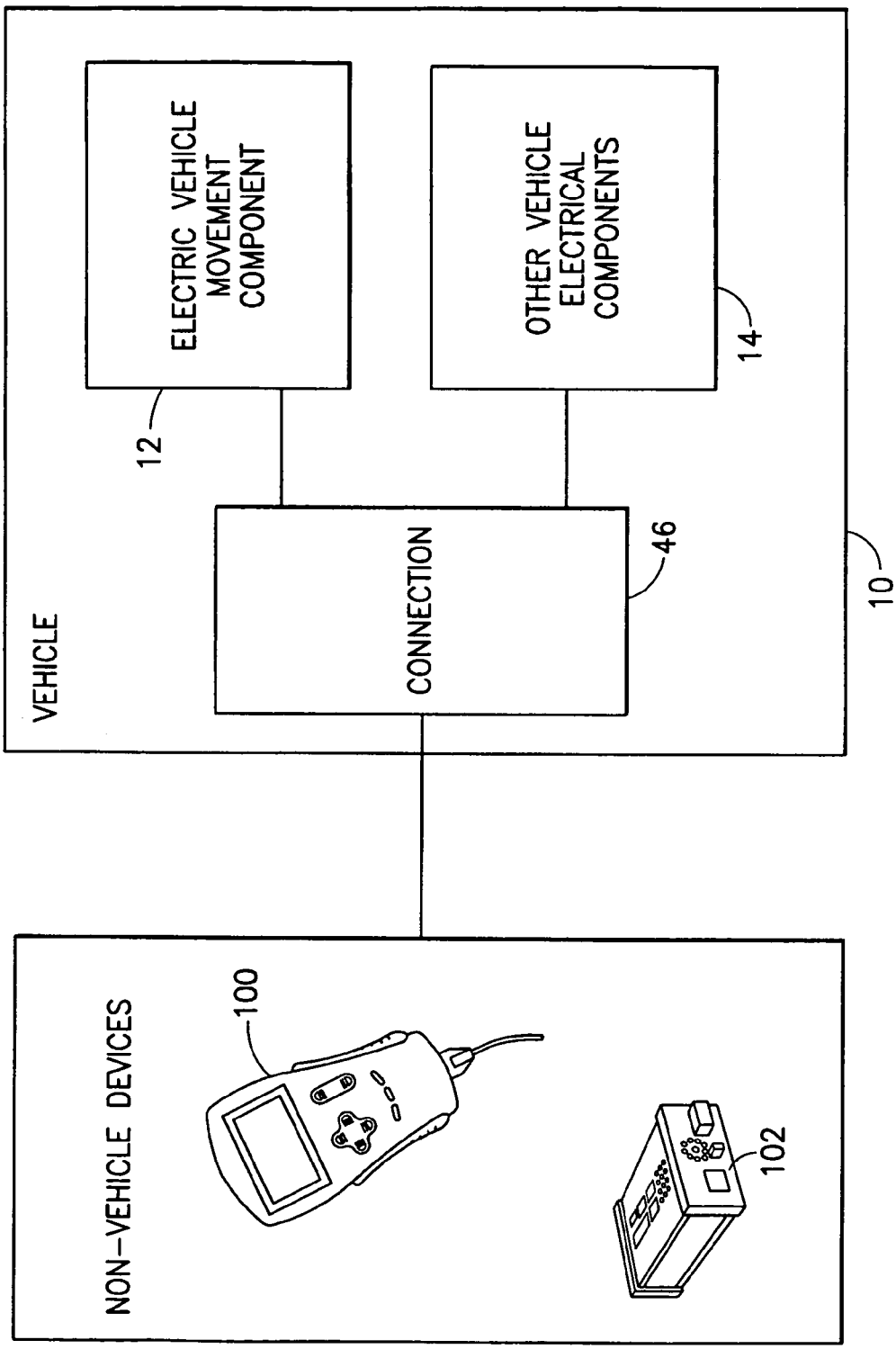
FIG. 13 is a diagram illustrating connection of the vehicle to non-vehicle devices.

Besides the electric vehicle movement components 12 and the other vehicle electrical components 14, the connection 46 can connect other non-vehicle devices, such as a programmer 100 or battery charger 102 shown in FIG. 13 for example, to one or more of the components 12, 14. The system could be configured to change the operational mode of the programmer 100, or battery charger 102, or one or more of the components 12, to have power use capabilities matched, or limited closer to each other, to prevent waste of power from the battery 16.

The example embodiment described above is only exemplary. FIG. 5 shows another example embodiment of a pallet jack 60 having some of the features described above. The operator walks behind the pallet jack 60, and controls its movement by means of the tiller head 62. In this embodiment the apparatus 60 does not comprise the vehicle management system 44. Instead, the apparatus 60 comprises a hydraulic pump 64 and the lift controller 38. User input controls 68 on the tiller head 62 and the lift controller 38 are connected to each other by a communications connections similar to the bus 46. In this example at least one of the two components 38, 68 is/are configured to change or select an operational mode based upon recognition of the type or capabilities of the other component. Thus, a device such as vehicle management system 44 (which acts as a controller for the entire system in FIG. 4) is not necessary to enable features of the invention. This allows a scalable manufacturing system which can have only two such components 12, 14 or more than two of such components 12, 14; depending upon the apparatus being manufactured and/or features desired. Thus, means may be provided for connecting two or more of the plurality of electric vehicle movement components 12 in a scalable manufacturing system such that the apparatus is one of a plurality of different possible types or models of the apparatus. The power operational mode(s) of one or more of the vehicle movement components 12 is/are selected based upon which components are connected to form the vehicle/apparatus.

FIG. 6 shows another alternate embodiment of a forklift 70 which comprises a single traction controller 36' rather than the dual traction controllers 36 used in the example embodiment of FIG. 1. In this example the vehicle management system 44 is configured to recognize that the single traction controller 36' is connected to the connection 46 rather than the dual traction controllers 36, and the vehicle management system 44 is configured to automatically select an operational mode to be used with the single traction controller 36' such that the two components 44, 36' have their power use capabilities matched or limited to correspond to each other, and thereby help to reduce waste of energy from the battery 16.

In one type of example embodiment an apparatus 10 is comprising a plurality of electric vehicle movement components 12, where a first one of the components is configurable to operate in one of a plurality of power operational modes; and a connection 46 connecting the plurality of electric vehicle components to each other. The first component is configured to select one of the operational modes based, at least partially, upon information through the connection regarding an identification of a second different one of the components and/or an operational capability of the second component.

The first electric vehicle movement component can comprise a traction controller 36, or a hydraulic pump controller 38, or a steering controller 42. The second electric vehicle movement component can comprise a user input device such as a foot pedal 28 and/or a hand moved input control 30. The second electric vehicle movement component can also comprise a vehicle management movement system controller 44. The plurality of electric vehicle movement components can further comprise a third electric vehicle movement component connected to the first and second components by the connection, where the first component is configured to select the operational mode of based, at least partially, upon information through the connection regarding an identification of the third component and/or an operational capability of the third component. The second electric vehicle movement component can comprises a battery monitor 52, and the information is an identification of a type of a battery connected to the battery monitor.

The apparatus can further comprise at least one vehicle indicator 54 or 56 configured to output information from the apparatus, where the at least one vehicle indicator is connected to the first component by the connection, and where the first component is configured to select the power operational mode based, at least partially, upon information through the connection regarding an identification of the vehicle indicator and/or an operational capability of the vehicle indicator, and/or where the at least one vehicle indicator is configured to select a power operational mode of the at least one vehicle indicator based, at least partially, upon information through the connection regarding an identification of the first component and/or an operational capability of the first component. The at least one vehicle indicator can comprise a user display 54 and/or a visual warning indicator 56.

The plurality of electric vehicle movement components may be selected from a group comprising a traction controller 36, a hydraulic pump controller 38, a steering controller 42, and a vehicle management system 44, a foot pedal 28, and hand controller 30, and the apparatus may further comprise at least one other component 14 selected from a group comprising a system expansion module 48, a DC/DC converter 50, a battery monitor 52, an instrument display 54, and a beacon 56, where at least one of the movement components 12 is configured to select a power operational mode based, at least partially, upon information through the connection regarding an identification of one or more of the other components 14 and/or an operational capability of one or more of the other components 14, and/or where at least one of the other components 14 is configured to select a power operational mode based, at least partially, upon information through the connection regarding an identification of one or more of the movement components 12 and/or an operational capability of one or more of the movement components 12.

The operational capability of the second component may be adapted to be changed by a user selected setting(s), and where the first component is configured to select the operation mode of the first component based upon the operational capability of the second component as limited by at least one of the user selected setting of the second component. The second component is configurable to operate in one of a plurality of power operational modes, where the second component is configured to automatically select one of the operational modes for the second component based, at least partially, upon information regarding an identification of a device connected to the second component which is controlled by the second component, and/or an operational capability of the device. The second device may be a traction controller 36 and the device is a wheel drive motor 32, or the second device may be a hydraulic pump controller 38 and the device is a hydraulic pump 40, or the second device may be a steering assembly 26 and the device is a steering controller 42.

In another example, the apparatus comprises a plurality of electric vehicle movement components, where a first one of the components is configurable to operate in one of a plurality of operating power ranges; and a system allowing the first component to select one of the operating power ranges based, at least partially, upon information from a second different one of the electric vehicle movement components regarding power capabilities of the second component, where the system enables the first component to select the operating power range to improve energy use efficiency by the first component and/or the second component.

The first and second components may be two of a group of electrical vehicle movement components comprising a traction controller, a hydraulic pump controller, a steering controller, and a vehicle management system, a foot pedal, and hand controller. The second component may be configurable to operate in one of a plurality of power operational ranges, where the second component is configured to automatically select one of the operational ranges for the second component based, at least partially, upon information regarding an identification of a device connected to the second component which is controlled by the second component, and/or an operational capability of the device. The second device may be a traction controller and the device is a wheel drive motor, or the second device may be a hydraulic pump controller and the device is a hydraulic pump, or the second device may be a steering assembly and the device is a steering controller.

The power operational range of the second component may be adapted to be changed by a user selected setting(s), and where the first component is configured to select the operating power range of the first component based upon the power operational range of the second component as limited by at least one of the user selected setting(s) of the second component. The system for allowing the first component to select the operating power range may comprise a connection between the first and second components, where the first component is configured to select the power operational range based upon a signal from the second component indicating identification of the second component and/or power capabilities of the second component without any other signal from another device or another electric vehicle movement component of the apparatus.

In another type of example embodiment an apparatus comprises a first electric vehicle movement component, where the first component is configured to operate in one of a plurality of power operational modes; and a second electric vehicle movement component connected to the first component, where the first movement component is configured to select one of the power operational modes based upon a signal from the second component indicating identification and/or operational capability of the second component without any other signal from another device or another electric vehicle movement component.

Figure 12:
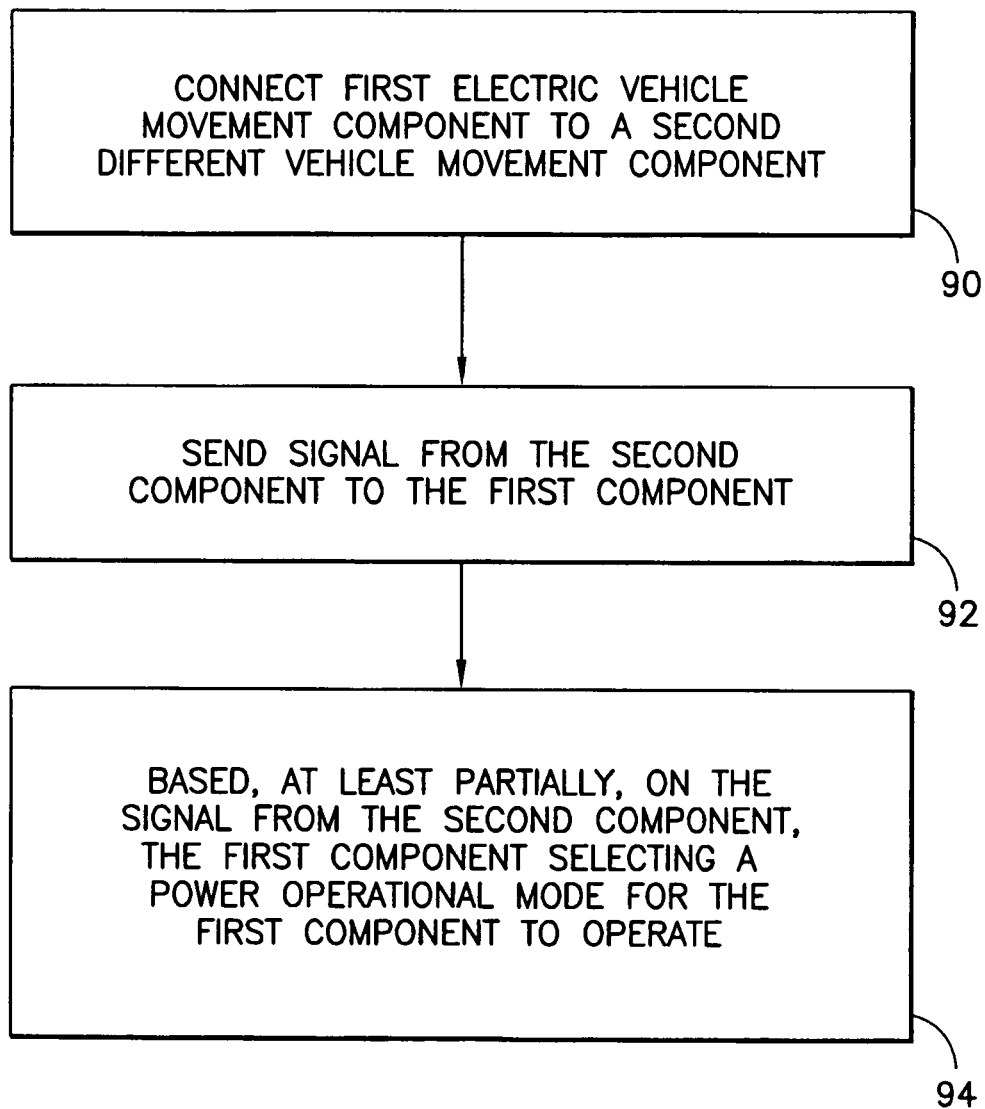
FIG. 12 is a diagram illustrating one example method.

Referring also to FIG. 12, an example method may comprise connecting a first electric vehicle movement component to a second different vehicle movement component as indicated by block 90; sending a signal from the second component to the first component as indicated by block 92, where the signal identifies the second component to the first component, and/or indicates a power operational capability of the second component to the first component, and based at least partially upon the signal from the second component, the first component selecting a power operational mode for the first component to operate as indicated by block 94 to increase energy use efficiency by the first and second components.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
 a plurality of electric vehicle movement components, where a first one of the components is configurable to operate in one of a plurality of power operational modes; and
 a connection connecting the plurality of electric vehicle components to each other,
 where the first component is configured to select one of the operational modes based, at least partially, upon:
  information through the connection regarding an identification of a second different one of the components and/or
  information through the connection regarding an operational capability of the second component,
 where the second electric vehicle movement component is not a battery.

2. An apparatus as in claim 1 where the first electric vehicle movement component comprises a traction controller, or a hydraulic pump controller, or a steering controller.

3. An apparatus as in claim 2 where the second electric vehicle .movement component comprises a user input device including a foot pedal and/or a hand moved input control.

4. An apparatus as in claim 2 where the second electric vehicle movement component comprises a vehicle management movement system controller.

5. An apparatus as in claim 1 where the plurality of electric vehicle movement components further comprises a third electric vehicle movement component connected to the first and second components by the connection, where the first component is configured to select the operational mode based, at least partially, upon information through the connection regarding an identification of the third component and/or an operational capability of the third component.

6. An apparatus as in claim 2 where the second electric vehicle movement component comprises a battery monitor, and the information is an identification of a type of a battery connected to the battery monitor.

7. An apparatus as in claim 1 further comprising at least one vehicle indicator configured to output information from the apparatus, where the at least one vehicle indicator is connected to the first component by the connection, and
 where the first component is configured to select the power operational mode based, at least partially, upon information through the connection regarding an identification of the vehicle indicator and/or an operational capability of the vehicle indicator, and/or
 where the at least one vehicle indicator is configured to select a power operational mode of the at least one vehicle indicator based, at least partially, upon information through the connection regarding an identification of the first component and/or an operational capability of the first component.

8. An apparatus as in claim 7 where the at least one vehicle indicator comprises a user display and/or a visual warning indicator.

9. An apparatus as in claim 1,
where the plurality of electric vehicle movement components are from a group comprising a traction controller, a hydraulic pump controller, a steering controller, and a vehicle management system, a foot pedal, and a hand controller, and
the apparatus further comprises at least one other component selected from a group comprising a system expansion module, a DC/DC converter, a battery monitor, an instrument display, and a beacon,
where at least one of the movement components is configured to select a power operational mode based, at least partially, upon information through the connection regarding an identification of one or more of the other components and/or an operational capability of one or more of the other components, and/or
where at least one of the other components is configured to select a power operational mode based, at least partially, upon information through the connection regarding an identification of one or more of the movement components and/or an operational capability of one or more of the movement components.

10. An apparatus as in claim 1 where the operational capability of the second component is adapted to be changed by a user selected setting(s), and where the first component is configured to select the operation mode of the first component based upon the operational capability of the second component as limited by at least one of the user selected setting of the second component.

11. An apparatus as in claim 1 where the second component is configurable to operate in one of a plurality of power operational modes, where the second component is configured to automatically select one of the operational modes for the second component based, at least partially, upon:
information regarding an identification of a device connected to the second component which is controlled by the second component, and/or
an operational capability of the device.

12. An apparatus as in claim 11 where
the second device is a traction controller and the device is a wheel drive motor, or
the second device is a hydraulic pump controller and the device is a hydraulic pump, or
the second device is a steering assembly and the device is a steering controller.

13. An apparatus as in claim 1 further comprising at least one other vehicle electrical component, where the apparatus is configured to be operationally connected to a non-vehicle device, and where the apparatus further comprising means configured to change an operational mode of the non-vehicle device and/or change the operational mode of one or more of the vehicle movement components or other vehicle electrical component(s) to have power use capabilities matched or limited closer to each other, to prevent waste of power from a battery of the apparatus.

14. An apparatus as in claim 1 further comprising means for connecting two or more of the plurality of electric vehicle movement components in a scalable manufacturing system such that the apparatus is one of a plurality of different possible types or models of the apparatus.

15. An apparatus as in claim 1 further comprising a learning, algorithm configured to learn how often a battery of the apparatus needs to be recharged, and set the operational mode(s) of one or more of the electric vehicle movement components to help prevent the apparatus from running out of battery charge during a work day or work shift or duty cycle of the apparatus.

16. An apparatus as in claim 1 further comprising a feedback system configured to provide cues or prompts to an operator to use the apparatus in a more energy efficient manner.

17. An apparatus comprising:
a plurality of electric vehicle movement components, where a first one of the components is configurable to operate in one of a plurality of operating power ranges; and
a system allowing the first component to select one of the operating power ranges based, at least partially, upon information from a second different one of the electric vehicle movement components regarding power capabilities of the second component, where the system enables the first component to select the operating power range to improve energy use efficiency by the first component and/or the second component,
where the second electric vehicle movement component is not a battery.

18. An apparatus as in claim 17 where the first and second components are two of a group of electrical vehicle movement components comprising a traction controller, a hydraulic pump controller, a steering controller, and a vehicle management system, a foot pedal, and hand controller.

19. An apparatus as in claim 17 where the second component is configurable to operate in one of a plurality of power operational ranges, where the second component is configured to automatically select one of the operational ranges for the second component based, at least partially, upon:
information regarding an identification of a device connected to the second component which is controlled by the second component, and/or
an operational capability of the device.

20. An apparatus as in claim 19 where
the second device is a traction controller and the device is a wheel drive motor, or
the second device is a hydraulic pump controller and the device is a hydraulic pump, or
the second device is a steering assembly and the device is a steering controller.

21. An apparatus as in claim 19 where the power operational range of the second component is adapted to be changed by a user selected setting(s), and where the first component is configured to select the operating power range of the first component based upon the power operational range of the second component as limited by at least one of the user selected setting(s) of the second component.

22. An apparatus as in claim 17 where the system for allowing the first component to select the operating power range comprises a connection between the first and second components, where the first component is configured to select the power operational range based upon a signal from the second component indicating identification of the second component and/or power capabilities of the second component without any other signal from another device or another electric vehicle movement component of the apparatus.

23. An apparatus comprising:
a first electric vehicle movement component, where the first component is configured to operate in one of a plurality of power operational modes; and a second electric vehicle movement component connected to the first component,
where the first movement component is configured to select one of the power operational modes based upon:
a signal from the second component indicating identification of the second component, and/or
a signal from the second component indicating operational capability of the second component,
without any other signal from another device or another electric vehicle movement component,
where the second electric vehicle movement component is not a battery.

24. A method comprising:
connecting a first electric vehicle movement component to a second different vehicle movement component;
sending a signal from the second component to the first component, where the signal:
identifies the second component to the first component, and/or
indicates a power operational capability of the second component to the first component, and
based, at least partially, on the signal from the second component, the first component selecting a power operational mode for the first component to operate to increase energy use efficiency by the first and second components,
where the second electric vehicle movement component is not a battery.

* * * * *